United States Patent
Desjoyeaux et al.

(10) Patent No.: US 11,686,247 B2
(45) Date of Patent: Jun. 27, 2023

(54) ACOUSTIC PANEL FOR A NACELLE OF AN AIRCRAFT PROPULSION UNIT, AND RELATED MANUFACTURING METHODS

(71) Applicant: Safran Nacelles, Gonfreville l'Orcher (FR)

(72) Inventors: Bertrand Desjoyeaux, Moissy Cramayel (FR); Marc Versaevel, Moissy Cramayel (FR)

(73) Assignee: Safran Nacelles, Gonfreville L'Orcher (FR)

( * ) Notice: Subject to any disclaimer, the term of this patent is extended or adjusted under 35 U.S.C. 154(b) by 602 days.

(21) Appl. No.: 16/806,188

(22) Filed: Mar. 2, 2020

(65) Prior Publication Data

US 2020/0200084 A1  Jun. 25, 2020

Related U.S. Application Data

(63) Continuation of application No. PCT/FR2018/052134, filed on Aug. 30, 2018.

(30) Foreign Application Priority Data

Aug. 31, 2017 (FR) .................................. 1758030
Apr. 12, 2018 (FR) .................................. 1853210

(51) Int. Cl.
*F02C 7/045* (2006.01)
*B64D 33/02* (2006.01)
*F04D 29/66* (2006.01)
*G10K 11/172* (2006.01)
*F02K 1/82* (2006.01)

(52) U.S. Cl.
CPC .............. *F02C 7/045* (2013.01); *B64D 33/02* (2013.01); *F04D 29/665* (2013.01); *G10K 11/172* (2013.01); *B64D 2033/0206* (2013.01); *F02K 1/827* (2013.01)

(58) Field of Classification Search
CPC .......... F02C 7/045; F02K 1/827; B64D 33/02
See application file for complete search history.

(56) References Cited

U.S. PATENT DOCUMENTS

| | | | |
|---|---|---|---|
| 3,831,710 A | 8/1974 | Wirt | |
| 4,150,732 A | 4/1979 | Hoch et al. | |
| 5,997,985 A * | 12/1999 | Clarke | B32B 3/12 428/116 |
| 6,274,216 B1 | 8/2001 | Gonidec et al. | |

(Continued)

FOREIGN PATENT DOCUMENTS

| | | |
|---|---|---|
| GB | 2452476 | 3/2009 |
| WO | 2016102894 | 6/2016 |

OTHER PUBLICATIONS

International Search Report for International Application PCT/FR2018/052134, dated Nov. 29, 2018.

*Primary Examiner* — Michael L Sehn
(74) *Attorney, Agent, or Firm* — Burris Law, PLLC

(57) ABSTRACT

An acoustic panel with a cellular core includes cells that are provided with one or more obstacles, each of the obstacles extending transversely in relation to the main axis of the associated cell so as to increase the length of the path (F) that sound waves travel through the cell. Methods enabling the production of such a panel implements steps of cutting, folding and bonding that are suitable for creating cells provided with such obstacles.

16 Claims, 12 Drawing Sheets

(56) References Cited

U.S. PATENT DOCUMENTS

| | | | |
|---|---|---|---|
| 8,651,233 B2 * | 2/2014 | Ayle | G10K 11/172 |
| | | | 181/292 |
| 9,514,734 B1 | 12/2016 | Jones et al. | |
| 2013/0299274 A1 | 11/2013 | Ayle | |
| 2015/0060194 A1 | 3/2015 | Pongratz et al. | |
| 2015/0292413 A1 | 10/2015 | Soria et al. | |
| 2017/0122341 A1 | 5/2017 | Alonso-Miralles et al. | |
| 2018/0218723 A1 * | 8/2018 | Lin | B32B 15/02 |

* cited by examiner

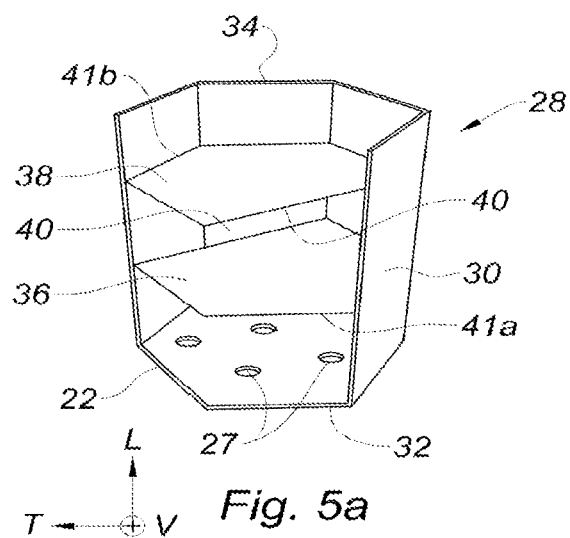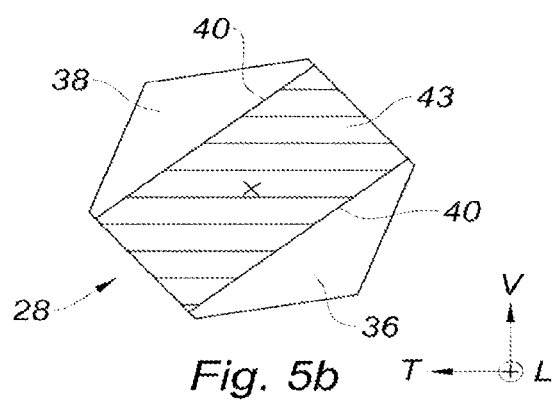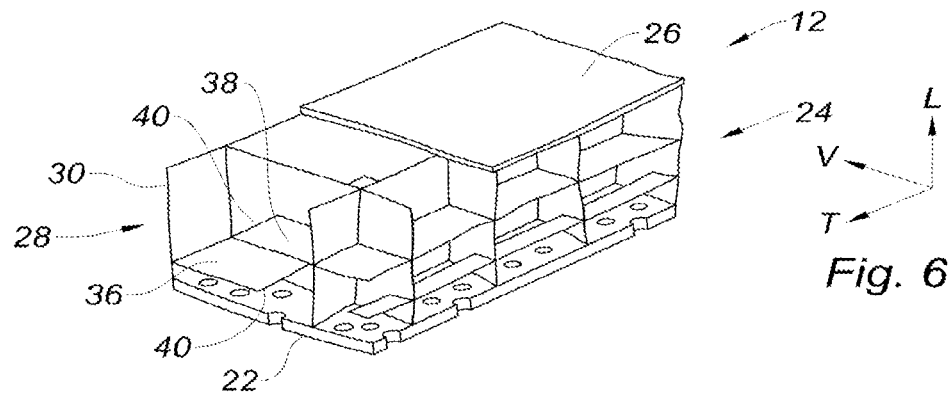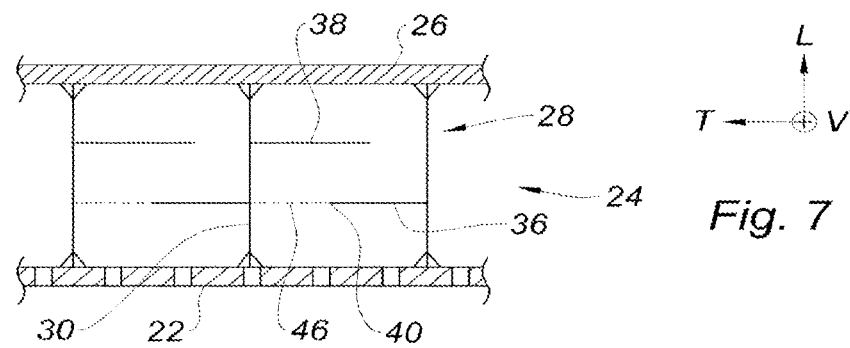

ACOUSTIC PANEL FOR A NACELLE OF AN AIRCRAFT PROPULSION UNIT, AND RELATED MANUFACTURING METHODS

CROSS-REFERENCE TO RELATED APPLICATIONS

This application is a continuation of International Application No. PCT/FR2018/052134, filed on Aug. 30, 2018, which claims priority to and the benefit of FR 17/58030, filed on Aug. 31, 2017 and FR 18/53210, filed on Apr. 12, 2018. The disclosures of the above applications are incorporated herein by reference.

FIELD

The present disclosure relates to an acoustic panel with resonators which is particularly adapted to be arranged in a reduced volume. The present disclosure also concerns methods for manufacturing such a panel as well as an aircraft propulsion unit comprising such a panel.

BACKGROUND

The statements in this section merely provide background information related to the present disclosure and may not constitute prior art.

It is known to use an acoustic panel to absorb a noise according to the Helmholtz resonator principle, such an acoustic panel equips, for example, an aircraft propulsion unit, such as a nacelle, which houses an engine or a turbojet engine, to limit the propagation of noise generated by the engine or by any other noisy member housed within the nacelle.

To this end, the acoustic panel generally includes a perforated front acoustic skin, a solid rear skin and a honeycomb-type cellular core, which is interposed between the two skins.

The cellular core forms a plurality of adjoining acoustic cells, each cell being delimited by a peripheral wall, and each cell extending along a longitudinal main axis corresponding to an axis of noise propagation.

The acoustic skin is arranged opposite the source of sound to be attenuated, and it has perforations to enable the passage of sound waves through the acoustic skin, so that the sound wave penetrates into the cells of the cellular core.

The length of the cells allows determining the frequency at which the acoustic attenuation of the cells is maximum.

Typically, a cellular core with a 30 millimeter thickness is adapted to attenuate frequencies close to 2000 Hertz, and a cellular core with a 70 millimeter thickness is adapted to attenuate frequencies close to 880 Hertz.

In general, the cells extend in a rectilinear manner perpendicular to the acoustic skin. Consequently, the acoustic length of the cells is substantially equal to the height of the cellular core.

Propulsion units of aircrafts evolve towards a geometry with a larger diameter, therefore with slower rotary elements, such as fans, the rotary elements consequently having a lower frequency acoustic signature.

In addition, nacelles of propulsion units tend to become shorter and thinner so as to limit the drag.

The acoustic panels that equip the nacelle must therefore have a limited thickness, while effectively attenuating the low frequencies.

Similarly, attenuation of the low frequencies emitted is being pursued, for example by propeller aircraft engines, while limiting the thickness occupied by the acoustic panel.

There is also known an acoustic panel which is described and represented in the document U.S. Pat. No. 9,514,734, and which includes a perforated acoustic skin and a plurality of acoustic cells which are delimited therebetween by partitions.

Some adjacent cells are interconnected with each other by a large opening made in the separating partition so as to enable the propagation of waves in the cell thus connected and to increase the length traveled by the sound waves, the length of the cells being adapted to attenuate a predetermined frequency of the noise spectrum.

A drawback of this type of acoustic panel with interconnected cells is the reduction of the surface of the acoustic skin treated acoustically.

Indeed, according to this document, the acoustic skin has portions which are not perforated and which are arranged opposite a portion of the interconnected cells, the non-perforated portions of the acoustic skin not participating in the acoustic treatment of the noise.

SUMMARY

This section provides a general summary of the disclosure and is not a comprehensive disclosure of its full scope or all of its features.

The present disclosure relates to an acoustic panel which has a limited thickness and which is adapted to attenuate low frequencies.

The present disclosure also provides methods particularly adapted for the manufacture of such an acoustic panel.

For this purpose, the present disclosure concerns an acoustic panel with resonators for a nacelle for an aircraft propulsion unit, including a plurality of adjoining acoustic cells which form a cellular core, each cell being delimited by a peripheral wall, and each cell extending along a longitudinal main axis corresponding to an axis of propagation of the sound waves, from a front end up to a rear end. According to the present disclosure, at least one cell includes at least one partial obstacle which extends transversely to the main axis of the associated cell, from the wall of said cell, the at least one obstacle having a free end edge which delimits a passage with a portion of the opposite wall to increase the length of the path traveled by the sound waves through the cell.

In one form, the at least one partial obstacle may extend perpendicularly, or generally perpendicular to the main axis of the associated cell.

Such an acoustic panel allows, at equal cell height and without loss of acoustic treated surface, attenuating lower noise frequencies.

Consequently, the present disclosure allows limiting the volume of the acoustic panel as well as the mass thereof.

In one form, at least one cell may include a first obstacle and a second obstacle, the first obstacle and the second obstacle being shifted along the main axis, the passage delimited by the free end edge of the first obstacle and the passage delimited by the free end edge of the second obstacle being radially shifted so as to form a baffle intended to increase the length of the path traveled by the sound waves through the associated cell.

In one form, a portion of the free end of the first obstacle and a portion of the free end of the second obstacle may be superimposed along the main axis of the associated cell, to inhibit the sound waves from drawing a direct path from the front end up to the rear end of the associated cell.

In another form, each obstacle may have a dimension approximately equal to two thirds of the cross-section of the associated cell.

According to another feature, the cells may be acoustically independent.

The expression "acoustically independent" means that the cells have no orifice for communicating with each other or that these orifices, such as fluid drainage orifices in particular, have small dimensions and are in small number, so as not to deflect the acoustic waves.

In one form, at least one of the cells may include at least one acoustically permeable septum which may extend across the associated cell.

According to one form, the septum may extend from the free end edge of the at least one obstacle, up to the wall of the associated cell.

According to another form, the septum can extend from the free end edge of the first obstacle, up to the free end edge of the second obstacle.

In one form, the acoustic panel may combine cells with at least one obstacle and cells devoid of any obstacle.

In another form, the acoustic panel may include a front acoustic skin which is perforated and a solid rear skin, the cellular core being interposed between said skins.

In one form, the at least one obstacle may comprise a central portion which extends transversely with respect to the main axis of the associated cell and two lateral portions each of which may extend in an oblique direction with respect to said main axis of the associated cell. For each of the two lateral portions, the oblique direction may, for example, be between 30° and 60° with respect to the main axis.

In one form, for each cell or for one or several cell(s), the peripheral wall may comprise six faces forming a hexagonal cell, the at least one obstacle being fastened to at least two adjacent faces of the associated cell.

In one form, for each cell or for one or several cell(s), the peripheral wall may comprise six faces forming a hexagonal cell, the at least one obstacle being fastened to at least two non-adjacent faces of the associated cell.

In another form, for each cell or for several cell(s), the peripheral wall may comprise six faces forming a hexagonal cell, the at least one obstacle being fastened to at least two adjacent or non-adjacent faces of the associated cell.

When a cell is hexagonal, this cell may form a regular hexagon or not. In particular, the dimensions of each face may be different from one face to another and/or the angle formed by two adjacent faces may differ from one pair of adjacent faces to another pair of adjacent faces.

The present disclosure also concerns a nacelle for an aircraft propulsion unit, this nacelle comprising at least one acoustic panel as described above.

The present disclosure also concerns methods for manufacturing such an acoustic panel.

According to a first variant of the method for manufacturing an acoustic panel according to the present disclosure, the at least one obstacle is made from at least one ribbon. This method comprises:

a fastening step in which the at least one ribbon is fastened to a first plate, and in which a second plate is fastened to the first plate by respective nodal portions, a forming step in which non-nodal portions of the first and second plates are shaped so that each non-nodal portion of the first plate constitutes, with a respective non-nodal portion of the second plate, said peripheral wall delimiting a corresponding cell of the cellular core, and so that a portion of the at least one ribbon forms the at least one obstacle in this cell.

In one form, during the fastening step, the at least one ribbon may extend throughout said nodal portions of the first and of the second plate.

In one form, a strip may be fastened at one end of the at least one ribbon during the fastening step. During the forming step, said portion of the at least one ribbon forming the at least one obstacle can be shaped by pulling the strip.

In one form, at least two ribbons are fastened respectively to the first plate and/or to the second plate during the fastening step, and the forming step is carried out so that a respective portion of each of said at least two ribbons each forms a respective obstacle. In other words, portions of said at least two ribbons can thus form at least two obstacles in one cell. In this form, a strip may be fastened at a respective end of said at least two ribbons during the fastening step. During the forming step, the portions of the ribbons forming the obstacles can be shaped by pulling the strip.

In one form, the at least one obstacle may be fastened to three adjacent faces of the associated cell, these three adjacent faces being portions of the first plate and/or of the second plate.

According to a second variant of the method for manufacturing an acoustic panel in accordance with the present disclosure, for manufacturing an acoustic panel comprising a first plate and a second plate fastened together by nodal portions, in which non-nodal portions of the first and of the second plate form walls delimiting cells of the cellular core, a step of fastening the at least one first obstacle to a respective non-nodal portion of the first and of the second plate is carried out.

In one form, a first leg for fastening the at least one first obstacle may be fastened to a non-nodal portion of the first plate, the first leg extending in the direction of a first end of the associated cell, and a second leg for fastening the at least one first obstacle may be fastened to a non-nodal portion of the second plate, the second leg extending in the direction of a second end of the associated cell.

In another form, a first fastening leg of the at least one first obstacle may be fastened to a non-nodal portion of the first plate, the first leg extending in the direction of one of the ends of the associated cell, and a second fastening leg of the at least one first obstacle may be fastened to a non-nodal portion of the second plate. The second leg may extend either in the direction of the same end of the associated cell or in the direction of the other end of the associated cell.

According to a third variant of the method for manufacturing an acoustic panel in accordance with the present disclosure, the method comprises a step of cutting a plate, a step of folding the cut plate and a gluing step, so that the cut, folded and glued plate forms after deployment said peripheral walls of the cells and said at least one obstacle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 5a is a schematic perspective view with cutaway which illustrates a hexagonal cell of one of the acoustic panels of FIG. 1 equipped with two obstacles forming a baffle according to the present disclosure;

FIG. 5b is a schematic view of a cell which illustrates the superposition of two obstacles according to the present disclosure;

FIG. 6 is a schematic perspective view with cutaway which illustrates the parallelepipedic cells of one of the acoustic panels of FIG. 1 each equipped with two obstacles forming a baffle according to the present disclosure;

FIG. 7 is a schematic cross-sectional view which illustrates cells of one of the acoustic panels of FIG. 1 each equipped with a septum which connects an obstacle on the wall according to the present disclosure;

Figure 1:
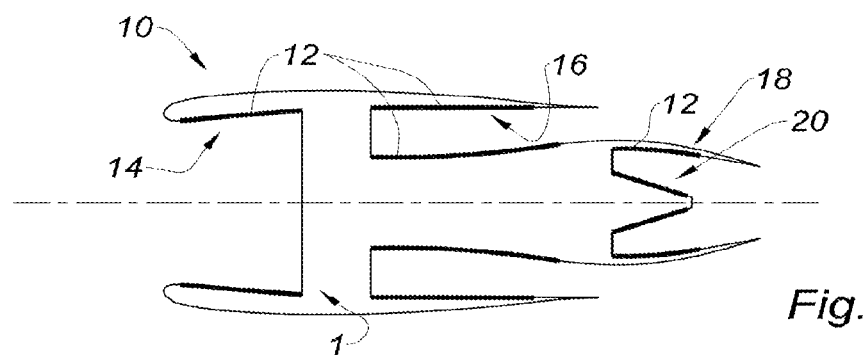
FIG. 1 is a schematic sectional view which illustrates a nacelle equipped with a plurality of acoustic panels according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the description and the claims, the longitudinal, vertical and transverse terminology will be adopted without limitation, with reference to the trihedron L, V, T indicated in the figures.

The expressions "front" and "rear" will also be used without limitation, with reference to the lower portion and to the upper portion respectively of FIGS. 2 to 11.

FIG. 1 shows a nacelle 10 equipped with a plurality of acoustic panels 12 with acoustic attenuation resonators schematically represented in bold line. Some or all of these, or of other acoustic panels may be totally or partially fitted with cellular cores according to the present disclosure.

The acoustic panels 12 are designed so as to attenuate the noise emitted by the members that are housed within the nacelle 10, such as an engine or a fan (not represented).

According to exemplary forms of the present disclosure described herein, the acoustic panels 12 are integrated in an air intake shroud 14, in a fan cowl or the secondary flow path 16 and in an ejection nozzle 20.

Figure 2:
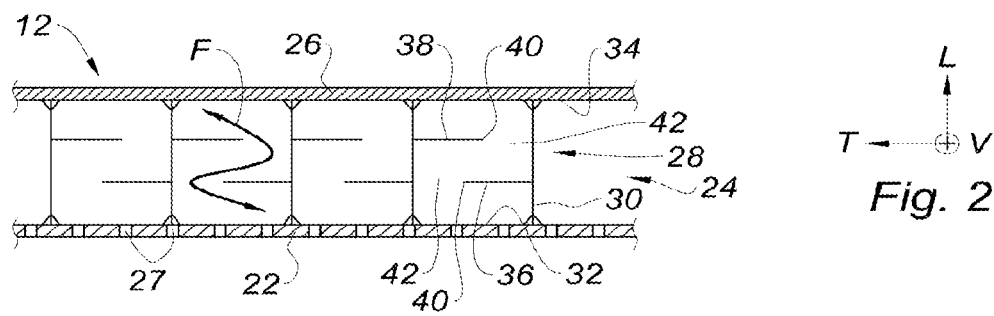
FIG. 2 is a schematic cross-sectional view which illustrates cells of one of the acoustic panels of FIG. 1 equipped with two obstacles forming a baffle according to the present disclosure.

Referring to FIG. 2, which illustrates a first form of an acoustic panel 12, the acoustic panel 12 successively includes, from front to back along the longitudinal axis L and in the direction of propagation of the noise, a front acoustic skin 22, a cellular core 24 and a solid rear skin 26.

The front acoustic skin 22 and the rear skin 26 extend parallel to each other and transversely. The longitudinal direction L is substantially perpendicular to the local surface of the acoustic skin 22.

Also, the front acoustic skin 22 features a plurality of perforations 27, or a permeability formed by a mesh, which are adapted to enable the sound waves to penetrate into the cellular core 24.

The cellular core 24 includes a plurality of acoustic cells 28 which are joined transversely and vertically to each other to form a hollow structure such as, for example, a "honeycomb."

Each cell 28 is delimited by a peripheral wall 30 extending substantially parallel to the longitudinal direction from the acoustic skin 22 up to the rear skin 26. The shape of the cell 28 may be with a hexagonal cross-section, as shown in FIG. 5a, or rectangular, as illustrated in FIG. 6, or square or any other geometric shape.

Also, each cell 28 extends along a main longitudinal axis, generally corresponding to an axis of propagation of the sound waves, from a front end 32 of the cell 28 bearing on the acoustic skin 22, up to a rear end 34 bearing on the rear skin 26.

It should be noted that the cells 28 are acoustically independent. By the terms "acoustically independent cells," we consider cells whose walls 30 do not significantly propagate the acoustic waves from one cell to another. By these terms, we consider cells separated by tight walls or perforated walls with one or a few orifices with small dimensions and in a limited number whose function is mainly to facilitate the evacuation of liquids that might penetrate into the cells. These orifices are, in one form, in a number from two to four with a unitary section in the range of 1 to 4 mm$^2$, and located in the walls 30 of the cells, in the immediate vicinity of the rear end 34 of the acoustic core against the rear skin 26.

Obstacles are said to be opaque to acoustic waves, but may however be provided with a drainage device for the evacuation of liquids, for example, made by one or two orifices per obstacle and with a section in the range of 1 to 2 mm$^2$ each.

As shown in FIG. 2, each cell 28 includes at least a first partial obstacle 36 and a second partial obstacle 38 which extend generally transversely and perpendicular to the main axis of the associated cell 28, from the wall 30 of the cell 28.

In addition, each obstacle 36, 38 has a free end edge 40 which delimits a passage 42 with the opposite wall 30, to enable the passage of sound waves the penetrate into the associated cell 28.

The obstacles 36, 38 are shifted in depth along the longitudinal main axis of the associated cell 28.

The obstacles 36, 38 are substantially opposite, that is to say that the first obstacle 36 extends from a first hooking edge 41a on the left side of the wall 30, according to FIGS. 2 and 5a, and the second obstacle 38 extends from a second hooking edge 41b on the opposite right side of the wall 30, to form a baffle intended to increase the length of the path traveled by the sound waves through the associated cell 28.

In addition, the length of each obstacle 36, 38 is adapted so that the obstacles 36, 38 partially overlap in a view in longitudinal projection on a surface perpendicular to the longitudinal direction.

FIG. 5b shows the superposition surface 43 of the obstacles 36, 38 according to a longitudinal projection.

Consequently, the superimposed surface of the obstacles 36, 38 projected according to a plane perpendicular to the direction L is equal to the surface of the cross-section of the associated cell 28 and the sum of the projected surfaces of the two obstacles 36 and 38 is larger than the cross-section of the cell 28.

In another form, the surface projected longitudinally of each obstacle 36, 38 is approximately equal to two thirds of the projected surface of the associated cell 28.

Also, the surfaces projected longitudinally of the two obstacles 36, 38 have a superimposed surface 43 which corresponds to approximately one-third of the projected surface of the associated cell 28.

Thus, the sound waves follow a sinuous path between the obstacles 36, 38, from the front end 32 to the rear end 34 of the associated cell 28. This sinuous path is therefore longer than the distance in a straight line between the two end faces 32 and 34.

As illustrated by the arrow F in FIG. 2, the sound waves follow a sinuous path which has an apparent length longer than the length of a straight path.

It is observed that a cell with a 30 millimeters longitudinal thickness which comprises two obstacles extending over approximately two thirds of the section of the associated cell, is equivalent to a barrier-free cell with a 64 millimeters longitudinal thickness, in terms noise attenuation with respect to a given frequency.

Similarly, it is observed that a cell with a 30 millimeters longitudinal thickness which comprises three obstacles each extending over about two thirds of the section of the associated cell, the successive obstacles being attached to opposite walls, is equivalent to a barrier-free cell with a 70 millimeters longitudinal thickness, in terms of noise attenuation with respect to another considered frequency.

The cells 28 are made of a composite material or a metallic material, for example aluminum.

Also, the obstacles 36, 38 may be glued, welded, or fitted to the material forming the cells 28.

Figure 3:
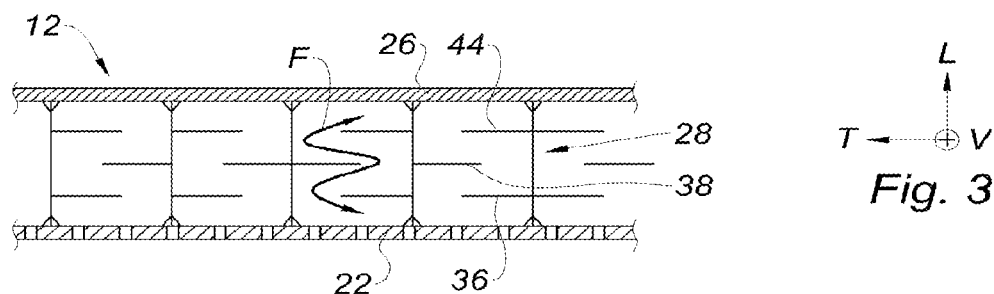
FIG. 3 is a schematic cross-sectional view which illustrates cells of one of the acoustic panels of FIG. 1 equipped with three obstacles forming a baffle according to the present disclosure.

According to another form represented in FIG. 3, which is similar to the example represented in FIG. 2, each cell 28 includes a third obstacle 44, the three obstacles 36, 38, 44 have dimensions such that two successive obstacles in the longitudinal direction, have a cumulative surface larger than the section of the cell and a projected surface covering the entire section. In other words, the obstacles are arranged so as to impose a sinuous path to the sound waves that travel through the associated cell 28, as shown by the arrow F.

Figure 4:
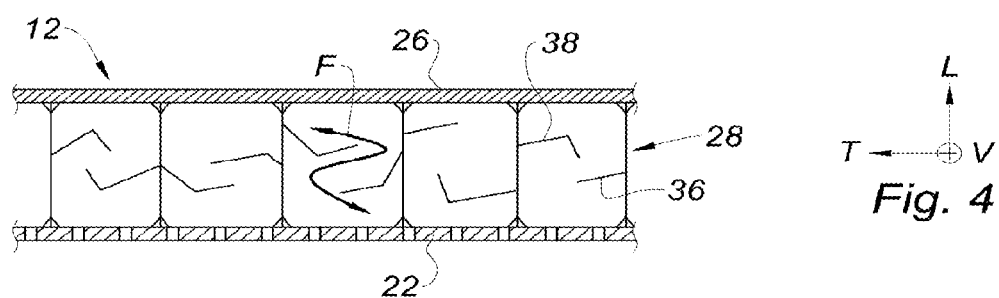
FIG. 4 is a schematic cross-sectional view which illustrates the cells of one of the acoustic panels of FIG. 1 each equipped with two non-planar obstacles forming a baffle according to the present disclosure.

According to another form represented in FIG. 4, which is similar to the example represented in FIG. 2, the obstacles 36, 38 may have non-rectilinear geometries with breaks, to increase the length of the path traveled by the sound waves through the associated cell 28, as shown by the arrow F.

According to another form represented in FIG. 7, which is similar to the example represented in FIG. 2, the first obstacle 36 of each cell 28 is extended by a septum 46 which extends transversely from the free end edge 40 of the first obstacle 36, up to the wall 30 of the cell 28, opposite the first obstacle 36.

A septum is a permeable or multi-perforated diaphragm which is transparent to certain frequency ranges and impermeable to other frequency ranges. This arrangement makes it possible to more effectively attenuate two frequency domains.

According to one form, the septum 46 is adapted to widen the range of attenuated frequencies.

Thus, in the example of FIG. 7, the cellular core is designed so as to effectively attenuate a first domain of medium acoustic frequencies between the first acoustic skin 22 and the septum 46, and the first obstacle 36, and another domain of lower acoustic frequencies between the acoustic skin 22 and the rear skin 26, taking into account the intermediate partial obstacles.

Figure 8:
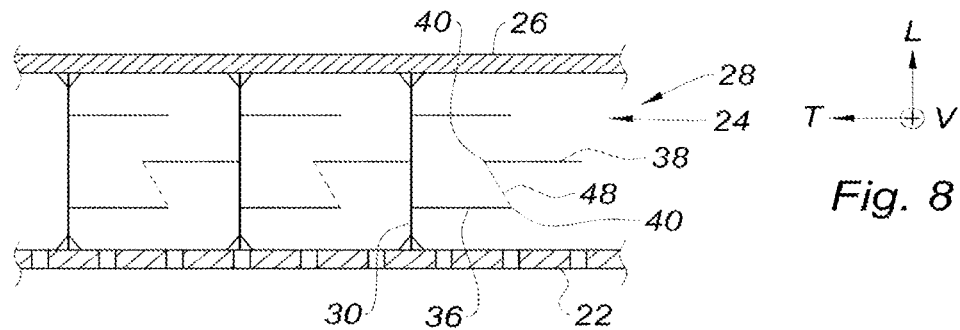
FIG. 8 is a schematic cross-sectional view which illustrates cells of one of the acoustic panels of FIG. 1 each equipped with a septum which connects two obstacles according to the present disclosure.

According to another form represented in FIG. 8, which is similar to the example represented in FIG. 2, a septum 48 extends from the free end edge 40 of the first obstacle 36, up to the free end edge 40 of the second obstacle 38.

Figure 9:
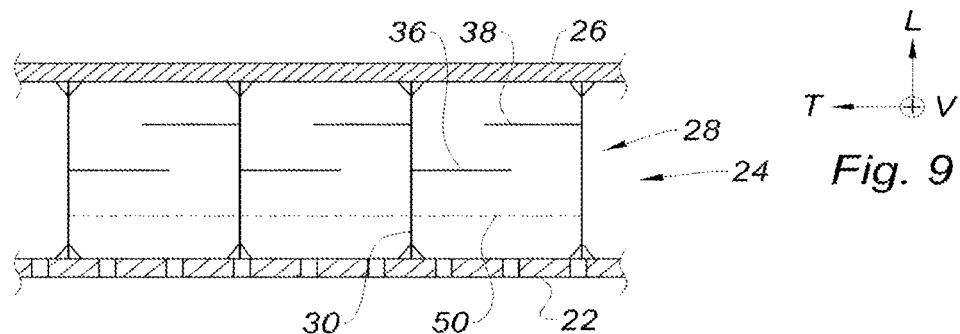
FIG. 9 is a schematic cross-sectional view which illustrates cells of one of the acoustic panels of FIG. 1 each equipped with a transverse septum according to the present disclosure.

According to another form represented in FIG. 9, which is similar to the example represented in FIG. 2, a septum 50 extends transversely in each cell 28 from the wall 30 of the associated cell, the septum 50 being interposed longitudinally between the acoustic skin 22 and the first obstacle 36.

Figure 10:
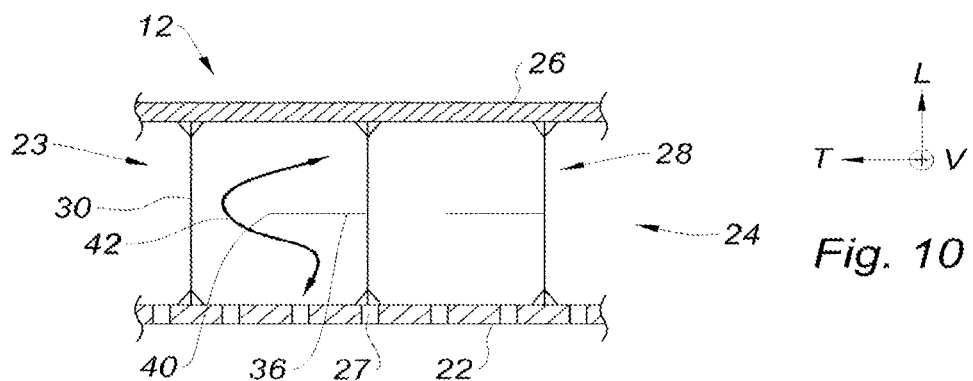
FIG. 10 is a schematic cross-sectional view which illustrates cells of one of the acoustic panels of FIG. 1 fitted with one single obstacle according to the present disclosure.

According to another form represented in FIG. 10, which is similar to the example represented in FIG. 2, each cell 28 includes one single obstacle 36 which has a transverse free end edge 40 which delimits a passage 42 with the opposite wall 30, to enable the passage of sound waves that penetrate into the associated cell 28.

Figure 11:
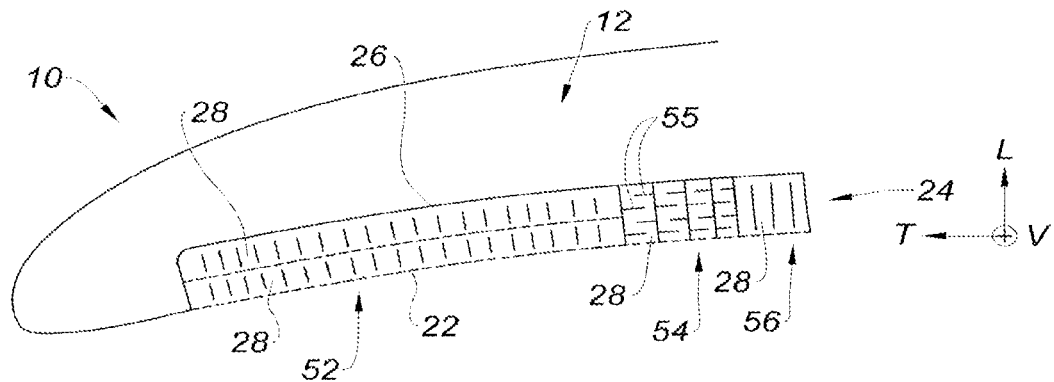
FIG. 11 is a schematic cross-sectional view illustrating an acoustic panel according to the present disclosure which is arranged in an air intake shroud of the nacelle of FIG. 1 and which allows for an acoustic treatment distributed by area.

According to another form represented in FIG. 11, the acoustic panel 12 combines cells 28 with obstacles and cells 28 without obstacles.

More particularly, the panel 12 according to FIG. 11 comprises a first portion 52 which comprises a first stage of cells 28 devoid of any obstacle and a second stage of cells 28 devoid of any obstacle, so as to form a double resonator.

The panel 12 includes a second portion 54 which is adjoined to the first portion 52 and which comprises cells 28 equipped with four obstacles 55 of the previously described type.

The second portion 54 is adapted to attenuate the low frequencies and is advantageously arranged in the vicinity of a fan of the nacelle 10 for example.

Finally, the panel 12 comprises in this example a third portion 56 which is adjoined to the second portion 54 and which has a cell stage 28 devoid of any obstacle.

The second portion 54 of the acoustic panel 12 is equivalent, in terms of noise attenuation, to a portion comprising cells devoid of any obstacle having a larger height, in the range of two to three times the height of the second portion 54 comprising cells with obstacles.

An advantage of this feature is that the rear skin 26 of the acoustic panel 12 is continuous and devoid of any perforation, therefore without degradation of mechanical performance, and the volume occupied by the acoustic treatment does not affect the volume located behind the acoustic panel 12.

Without limitation, cells with obstacles and the cells devoid of any obstacles may be distributed in a checkerboard fashion over the surface of the acoustic panel 12.

Figure 12:
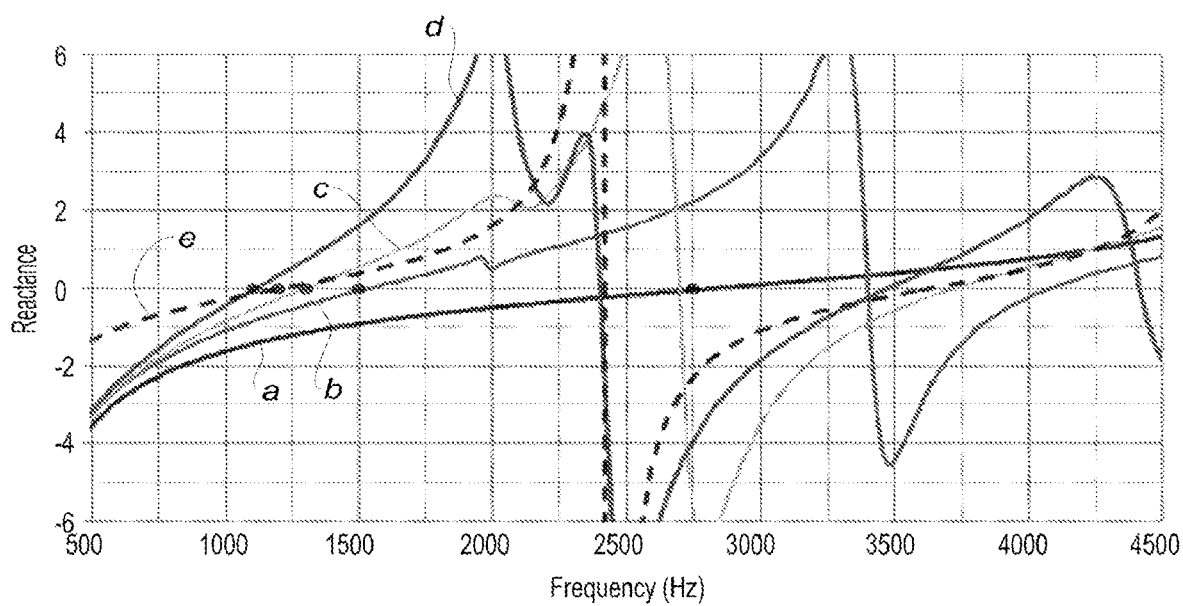
FIG. 12 is a graph which plots, for different patterns of cells according to the present disclosure, the reactance of said patterns according to the scale of the ordinate axis as a function of the frequencies in Hertz of acoustic waves according to the scale of the horizontal axis.

FIG. 12 shows a graph illustrating the capacity of acoustic attenuation of a noise due to various types of cells 28 during a test. On this graph, an improved attenuation capacity corresponds to the frequencies for which the reactance measured from the acoustic signature of the configuration, for example using a Kundt tube, is close to the value 0 on the axis of ordinates.

The curve "a" illustrates the acoustic attenuation of a "conventional" cell with a longitudinal 30 millimeter thickness, devoid of any obstacle.

The curve "a" crosses the zero reactance line, at an abscissa of about 2700 Hertz, which means that this cell effectively attenuates frequencies around 2700 Hertz, in the case of a plane wave with an incidence normal to the treatment.

The curve "b," which illustrates the acoustic attenuation of a cell including an obstacle and having a 30 millimeter thickness, effectively attenuates frequencies around 1500 Hertz.

The curve "c," which illustrates the acoustic attenuation of a cell including two obstacles and having a 30 millimeter thickness, effectively attenuates frequencies around 1300 Hertz.

The curve "d," which illustrates the acoustic attenuation of a cell including three obstacles and having a 30 millimeter thickness, effectively attenuates frequencies around 1100 Hertz.

The curve "e," which illustrates the acoustic attenuation of a cell devoid of any obstacle and having a 70 millimeter thickness, effectively attenuates frequencies around 1150 Hertz.

This test shows that, at equivalent cell height, the addition of obstacles makes it possible to attenuate lower frequencies. In particular, by adding three obstacles in a 30 millimeter thick cell, the behavior of a 70 millimeter thick conventional acoustic treatment is replicated.

In still other words, the addition of partial obstacles transversely to the length of a cell makes it possible to attenuate low frequencies in a cell with a smaller thickness than a cell devoid of any obstacle.

The previous description is provided as a non-limiting example.

It should be understood that the acoustic panel 12 may adopt planar or revolution shapes.

Similarly, the cells 28 may adopt sections with various shapes.

The present disclosure provides several configurations and methods for manufacturing such acoustic panels.

FIGS. 13-16 illustrate configurations of a cellular core with hexagonal cells. These configurations as well as corresponding methods are described below.

Figure 13:
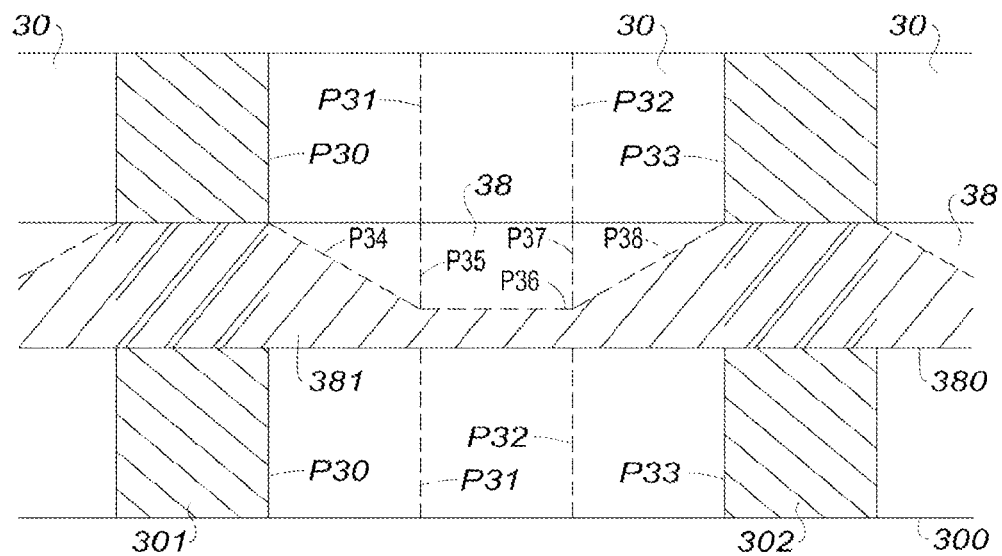
FIG. 13 is a partial schematic view of a plate and an intercellular ribbon for manufacturing an acoustic panel according to the present disclosure.

In one method, illustrated in FIG. 13, at least one obstacle 38 is made from at least one ribbon 380.

FIG. 13 partially shows a first plate 300 and a ribbon 380 placed on the first plate 300. This first plate 300 as well as this ribbon 380 are represented flat, that is to say unstretched, not deployed.

More specifically, FIG. 13 shows two nodal portions 301 and 302 of the first plate 300, these nodal portions being represented hatched. The nodal portions 301 and 302 are intended to be fastened to respective nodal portions of a second plate (not represented). The first plate 300 also comprises so-called non-nodal portions 30, represented not hatched in FIG. 13. These non-nodal portions 30 are intended to constitute walls delimiting the cells of the cellular core (see below).

In the example of FIG. 13, the ribbon 380 extends throughout said nodal portions 301 and 302 of the first plate 300. Thus, when the second plate will be disposed on the first plate 300, the ribbon 380, which will then be located between the first and the second plate, will extend throughout the respective nodal portions of these two plates.

The ribbon 380 also comprises several functional areas, in particular a fastening area 381 (hatched area of the ribbon) and a so-called free area 38 (non-hatched portion of the ribbon). In this example, each free area 38 is intended to constitute an obstacle for a respective cell (see below).

In the form of FIG. 13, the method comprises a step of fastening the ribbon 380 to the first plate 300. For this purpose, the surface of the ribbon 380 opposite the first plate 300 is fastened, for example by gluing, soldering or welding, to the first plate 300 by the fastening area 381 of the ribbon 380, said free area 38 of the ribbon 380 being separate from the first plate 300.

This method further comprises a step of fastening the second plate to the first plate 300. In this example, the nodal portions 301 and 302 of the first plate 300 are fastened, for example by gluing, soldering or welding, to nodal portions of the second plate located opposite the nodal portions 301 and 302 of the first plate 300. Of course, in the regions of the nodal portions 301 and 302 where the ribbon 380 extends (regions with double hatching in FIG. 13), the nodal portions of the two plates are not directly fastened to each other since the ribbon 380 is interposed between the two plates. In these regions, the nodal portions of the two plates are fastened to each other via the ribbon 380 to which they are fastened. In one variant, it is possible to provide openings or orifices in the regions of the ribbon 380 located on the nodal portions (regions with double hatching in FIG. 13), so that the two plates could also be fastened together throughout such openings or such orifices.

After fastening the ribbon 380 to the first plate 300 and the second plate to the first plate 300, this method comprises a step of forming these different elements so as to form the portion of the acoustic panel constituted by these elements.

In the forming step, the non-nodal portions of the first and second plates are shaped so that each non-nodal portion 30 of the first plate 300 constitutes, with an opposite non-nodal portion of the second plate, said peripheral wall delimiting a corresponding cell of the cellular core, and so that a portion of the at least one ribbon (non-hatched portion bearing the reference 38 in FIG. 13) forms the at least one obstacle 38 in this cell.

To facilitate forming and promote the formation of the desired angulations, the first plate 300 may include fold lines P30, P31, P32 and P33. These fold lines delimit respective faces of the cell (FIG. 13). The second plate may also comprise such fold lines.

Similarly, the ribbon 380 may comprise fold lines P34, P35, P36, P37 and P38 intended to facilitate the forming and promote the formation of the desired angulations, these fold lines delimiting different facets of the obstacle 38 (FIG. 13, and compare below the central and lateral portions).

In this example, it is understood that the wall of each cell will comprise, after implementation of the forming step, six faces forming a hexagonal cell, three faces being constituted by the first plate 300 (respectively between the fold lines P30 and P31, P31 and P32, and P32 and P33), three faces being constituted opposite thereto by the second plate.

In this example, the obstacle 38, that is to say the so-called free area of the ribbon 380, is fastened to three adjacent faces of the associated cell. These three faces are, in the above example, portions of the first plate 300. Alternatively, these three faces could be portions of the second plate by fastening the ribbon 380 not to the first plate 300 but to the second plate.

Of course, what has just been described may apply simultaneously to portions not represented in FIG. 13 of the first plate 300, of the ribbon 380 and of the corresponding second plate, FIG. 13 showing only a portion of these elements.

Similarly, several ribbons 380 may be used so as to constitute several obstacles 38 in the same cell.

Furthermore, this method may be implemented successively by fastening another ribbon on the second plate and then fastening a third plate on the second plate, and so on.

Figure 14:
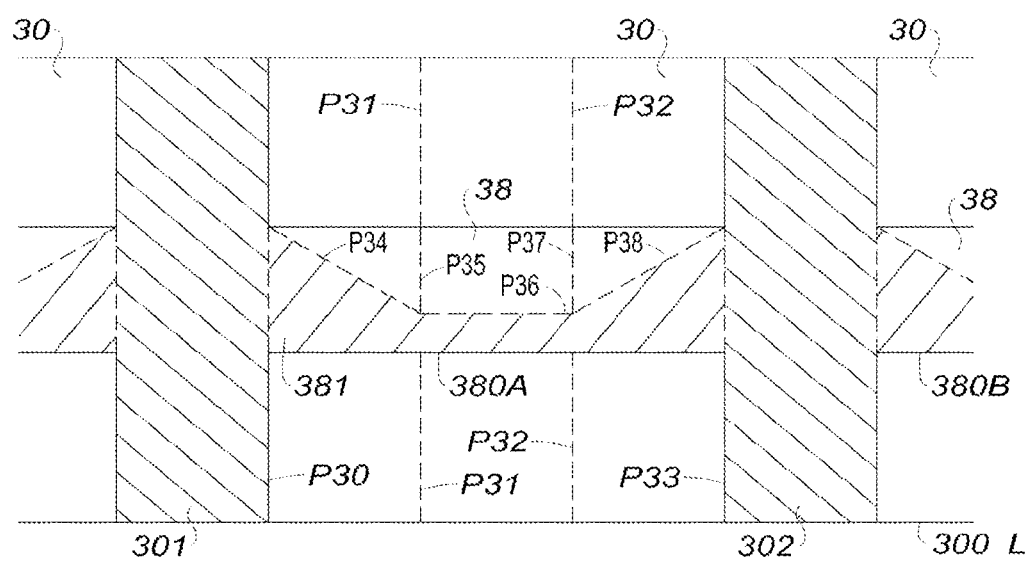
FIG. 14 is a partial schematic view of a plate and several intracellular ribbons for manufacturing an acoustic panel according to the present disclosure.

FIG. 14 illustrates another method making it possible to obtain a cellular core configuration similar to that of FIG. 13. This method is described below with regards to the difference from the method which has just been described.

In this example, no ribbon extends throughout the nodal portions 301 and 302 of the first plate, nor consequently throughout the nodal portions of the second plate.

In one form, this configuration is obtained by fastening the ribbon 380 in each cell of the cellular material after deployment of the cellular material.

In another form, the plates and ribbons are fastened together in a so-called flat arrangement. Several ribbons 380A/380B are fastened on the first plate 300, between nodal portions of this plate. For example, the ribbon 380A is fastened between the nodal portions 301 and 302 of the first plate 300.

Afterwards, a second plate is fastened to the first plate 300 by respective nodal portions of these plates. In this case, the nodal portions of the two plates are therefore fastened to one another by the entirety of the surfaces of the nodal portions since no ribbon extends through these nodal portions. This makes it possible to homogenize the fastening of the plates over the entire height of the cells (in the direction L) and avoids any excess thickness between the glued areas of the two plates.

The ribbons of the type described above with reference to FIG. 14, that is to say fastened between nodal portions of a plate, may comprise a fastening area 381 located in the same plane T-L as the so-called free area 38, that is to say that the fastening area 381 and the free area 38 may be areas of the same flat surface (before forming the obstacle), an area extending the other area in the same plane. Alternatively, with reference to FIG. 16, a ribbon 380C may comprise one or several fastening area(s) 381A/381B/381C folded back against the free area 38 of this ribbon. Nonetheless, the principle of fastening the ribbons to a plate is identical in both cases: the ribbon is fastened to a plate only by its fastening area(s).

In these different examples of the method, the forming may be carried out by applying a tensile force to the plates fastened to one another (in the direction V), this tensile force tending to separate the plates from one another.

This tensile force, taking into account the gluing of the plates by nodal portions and folded areas provided on the plates, makes it possible to conform the plates to constitute the cells of the cellular core.

The deployment of the so-called free portions 38 of the ribbons 380/380A/380B may be carried out independently, after conformation of the cells, by applying a tensile force to these free portions 38 (in the direction V) so as to deploy the obstacles 38 in the respective cells.

Figure 15:
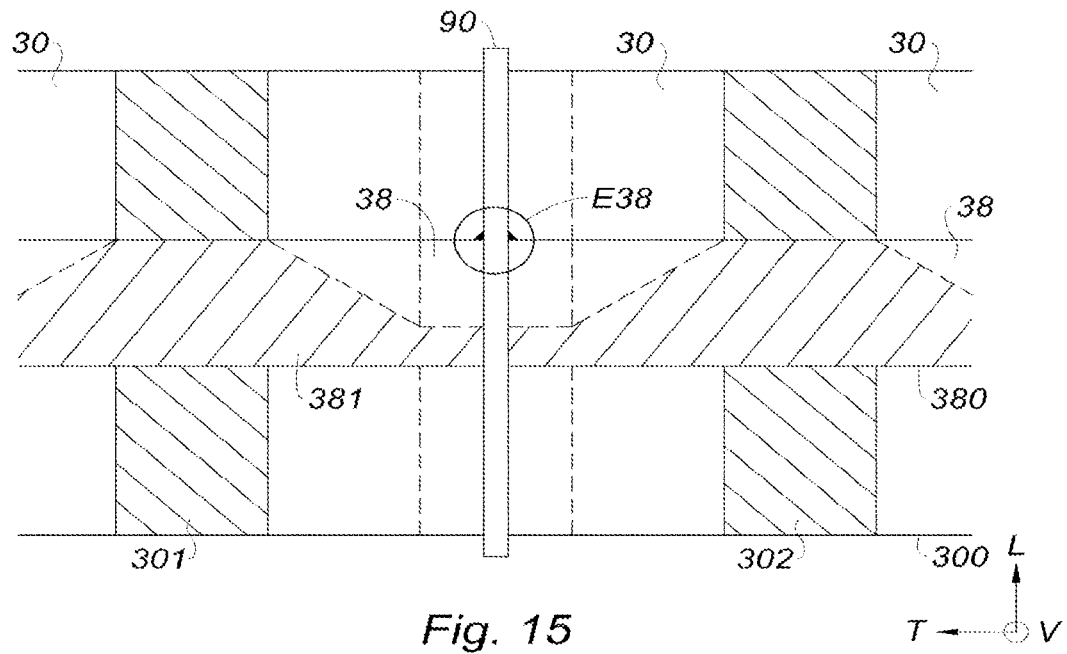
FIG. 15 is a partial schematic view of the plate and the ribbon of FIG. 13 further comprising a strip for conforming an obstacle according to the present disclosure.
Figure 16:
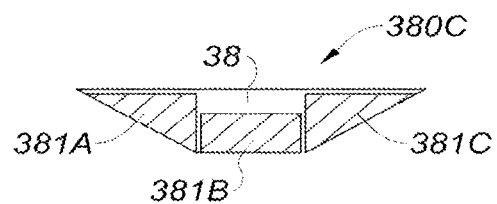
FIG. 16 is a schematic view of a ribbon for manufacturing an acoustic panel according to the present disclosure, the ribbon comprising folded fastening areas.

In one form, for a given cell, the deployment of the obstacle(s) 38 in this cell may be achieved using a strip 90 fastened to one end of the ribbon(s) 380 (FIG. 15) or extending the ribbon(s) 380 in a direction parallel to the direction V. FIG. 15 is based on the example of FIG. 13. A strip 90 is in this example fastened at one end E38 of the ribbon 380 before fastening the second plate on the first plate 300. Such a strip 90 allows, during the forming step, conforming the obstacle by pulling the strip 90 (in the direction V).

In the examples of FIGS. 13 to 15, the plies P34-P38 of the ribbon(s) 380/380A/380B makes it possible to confer, after deployment of said free portions of the ribbon(s), a geometric shape to the obstacles 38 in which each obstacle comprises:

a central portion, located between the plies P35, P36 and P37, which extends transversely, and in one form generally perpendicularly (in the direction V) with respect to the main axis of the associated cell, this main axis extending along the longitudinal direction L; and two lateral portions, respectively located between the plies P34 and P35, and between the plies P37 and P38, each extending in an oblique direction with respect to said main axis of the associated cell.

In another form, the plies and fastening areas of the ribbon(s) 380/380A/380B on the first plate 300 are determined so that the oblique direction of each of the lateral portions of the obstacle 38 is comprised between 30° and 60° with respect to the main axis. Advantageously, these angles enable the cell to be folded flat or deployed to form a cavity with a hexagonal section (regular or non-regular hexagon), or a rectangular section by over-expansion of the cellular core, without generating parasitic tension on the walls of the constitutive plates of the cellular material nor on the additional ribbon.

In general, the manufacturing methods according to the present disclosure are implemented so as to constitute at least two obstacles 36/38/44 per cell, or even three (compare above for the advantages conferred by the multiplication of the number of obstacles per cell).

As indicated above, in each cell, for two given obstacles 36/38, these obstacles 36/38 are shifted with respect to one another along the main axis, so that the passage 42 delimited by the free end edge 40 of the first obstacle 36 and the passage 42 delimited by the free end edge 40 of the second obstacle 38 are radially shifted so as to form a baffle. Such a baffle makes it possible to increase the length of the path traveled by the sound waves through the associated cell 28.

For this purpose, in the example of FIG. 13, a first ribbon 380 may be fastened to the first plate 300 between two nodal portions 301/302 of this first plate 300 and a second ribbon may be fastened to the second plate between two nodal portions of this opposite second plate, the first and second ribbons being shifted with respect to one another in the longitudinal direction L.

In addition, the first and second ribbons may be positioned so that, after deployment, the lateral portions of the first and of the second ribbon are oriented in the same direction along the direction L, or so that the lateral portions of the first ribbon are oriented in one direction along the direction L and that the lateral portions of the second ribbon are oriented in the other direction along the direction L.

In an example with at least two ribbons 380 fastened respectively on the first plate 300 and the second plate, it is possible to install a strip 90 fastened to the free end 38 of each of the ribbons 380. The deployment of the cellular core is made by pulling in the direction V the non-nodal portions of the first plate 300 and of the second plate, typically the respective central faces located between the fold lines P31 and P32. This deployment causes an increase in the distance between the respective free ends 38 of the ribbons 380, and therefore between the respective areas E38 for fastening the strip 90 to the ribbons. This sets the strip 90 in tension and forces the free ends 38 of the ribbons 380 to deploy transversely in the cell. In one example, the ribbons 380 will be installed so that the free ends 38 are furthest away from each other in the direction of the cell height (direction L) in order to promote the deployment without generating excessive tension on the strip.

What has just been described can be generalized to cases where a cell comprises three obstacles or more.

In another form, the step of fastening the plates and of forming the cells is carried out before fastening the ribbons. In this case, during these steps, the ribbons are therefore not placed on a plate. Once the cells have been formed, one or several ribbon(s), which in one variation are preformed, can be inserted and fastened therein, so as to constitute obstacles similar to those obtained by the method described above with reference to FIG. 14.

In these different examples, the plates constituting the walls of the acoustic cells may comprise or be produced of a material comprising aluminum, synthetic fibers of the Nomex® type, or of a fibrous fabric reinforced or not with a matrix. The ribbons for constituting the obstacles may comprise or be made of a material comprising aluminum, a synthetic plastic or thermoplastic film, Nomex® paper, impregnated with resin or of a fibrous tissue impregnated with resin.

The plates and ribbons are, in one form, assembled by gluing using thermoplastic or thermosetting glues. Whenever the respective materials allow so, the assembly may be carried out by welding or soldering.

Figure 17A:
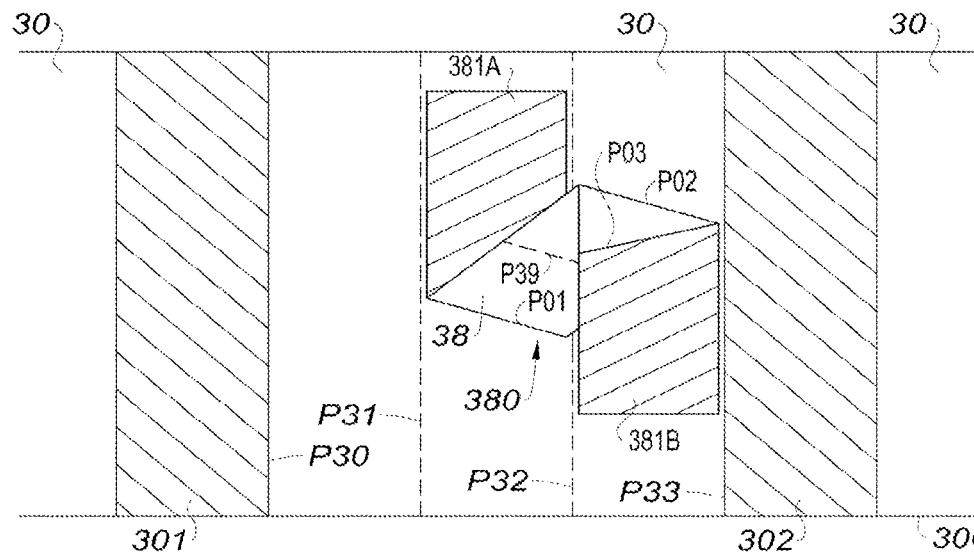
FIGS. 17A and 17B are partial schematic views of a plate and an intracellular ribbon for manufacturing an acoustic panel according to the present disclosure, in the flat position (FIG. 17A) and in the deployed position (FIG. 17B)
Figure 17B:
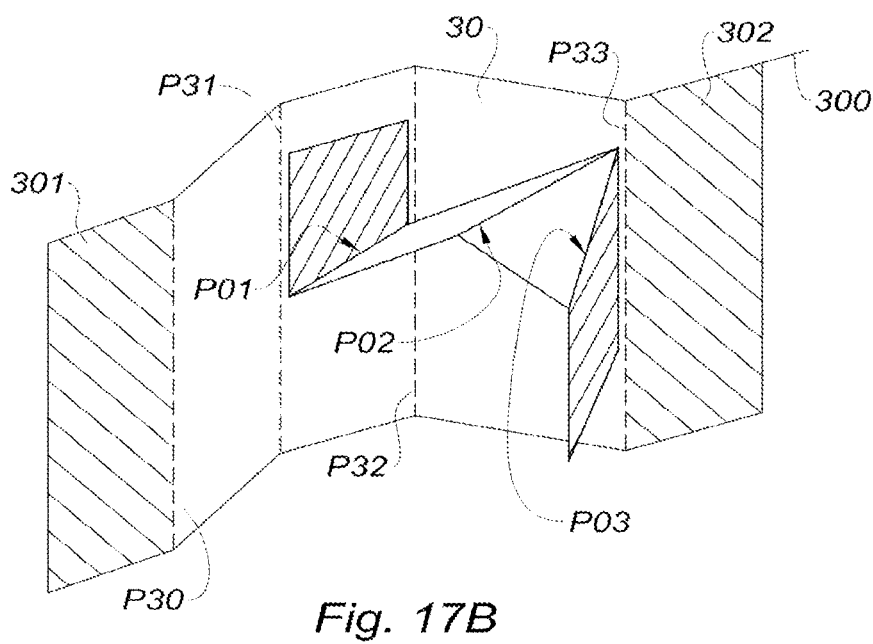
Figure 17C:
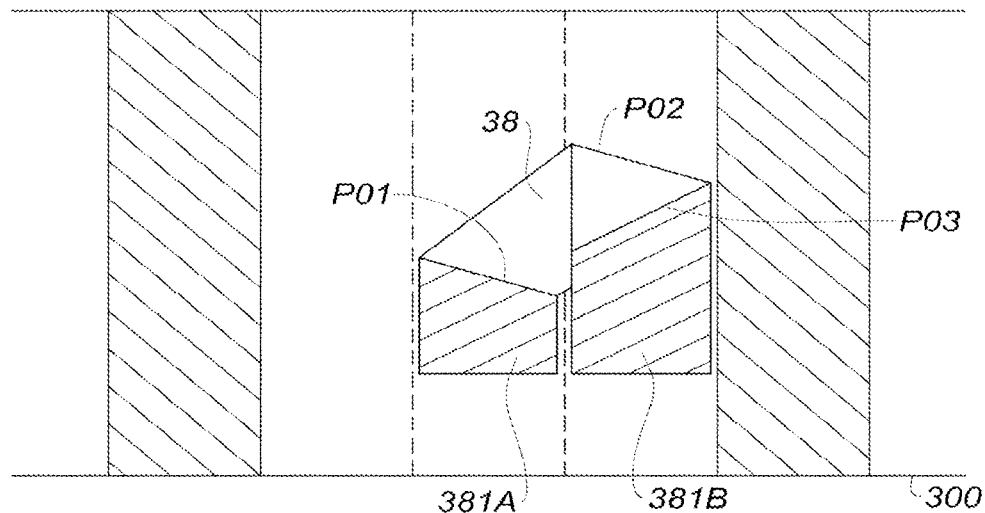
FIGS. 17C and 17D are partial schematic views of a plate and an intracellular ribbon for manufacturing an acoustic panel according to the present disclosure, in the flat position (FIG. 17C) and in the deployed position (FIG. 17D)
Figure 17D:
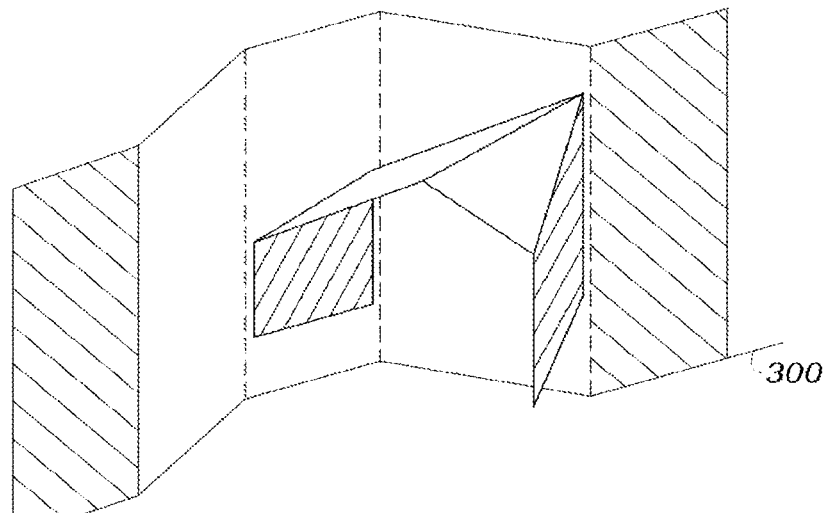

FIGS. 17A and 17B on the one hand, and FIGS. 17C and 17D on the other hand, illustrate two other configurations and corresponding methods making it possible to constitute an obstacle 38 from a ribbon 380.

In these configurations, a ribbon 380 is fastened on the one hand to a first plate 300, and on the other hand to a second plate.

Referring to the variant of FIGS. 17A and 17B, the ribbon 380 includes areas 381A and 381B for fastening the ribbon 380 and an area 38 between the areas 381A and 381B. In this example, the area 38 is quadrilateral. The area 38 is not glued to the plates and can be deployed transversely in the cell 28 during the deployment of the cellular core by conformation of the plates. During the deployment of the cellular core by pulling in the direction V of the non-nodal portions of the respective plates, the area 38 is bounded by a fold line P01 with the area 381A and a fold line P03 with the area 381B (FIG. 17A). In the flat position illustrated in FIG. 17A, the area 38 comprises two portions separated by the fold line P02 and delimited by the fold lines P01 and P03. These fold lines form an angle of at most 70° with the direction of the fold lines P31 and P32, and in one form are comprised between 30° and 60° with respect to the direction of these fold lines. Such an arrangement makes it possible to limit or cancel the tensile force exerted by the area 38 of the ribbon 380 during the deployment of the cellular core by spacing the plates. FIG. 17B illustrates the first plate 300 and the ribbon after deployment of the cellular core. As shown in FIGS. 17A and 17B, the portion of the area 38 located between the fold lines P02 and P03 and the area 381B are coplanar in the flat position (FIG. 17A) and are located in different planes after deployment of the cellular core (FIG. 17B).

In the variant of FIGS. 17C and 17D, the area 38 located between the lines P01 and P02 as well as the area 381A are coplanar in the flat position.

It is considered in this document that a hexagonal cell 28 obtained according to one of these methods comprises:

a central face of a first plate: in the example of FIG. 17A, this central face is that comprised between the fold lines P31 and P32 of the first plate 300;

two lateral faces of a first plate: in the example of FIG. 17A, these lateral faces are those comprised respectively between the fold lines P30 and P31, and between the fold lines P32 and P33 of the first plate 300;

a central face and two opposite lateral faces of a second plate.

Thus, each lateral face of a plate is located between a nodal portion of this plate and a central face of this plate, and each central face of a plate is located between two lateral faces of this plate.

In one configuration, the ribbon 380 may form a Z (FIGS. 17A and 17B) or a V (FIGS. 17C and 17D).

According to this configuration described with reference to FIGS. 17A to 17D, a first fastening leg 381A of the ribbon 380 is fastened on a portion of the first plate 300 located between two fold lines. In this example, the first fastening leg 381A is fastened between the lines P31 and P32, that is to say on the central face of the first plate 300.

The ribbon 380 is folded along the fold line P01 and the fold line P02 so that a second fastening leg 381B is located opposite a lateral face of the second plate deposited on this set before fastening these two plates to each other by their respective nodal portions.

In the example of FIGS. 17A and 17B, the first leg 381A extends in the direction of a first end of the associated cell (towards the top of FIG. 17A) and the second leg 381B extends in the direction of a second end of this cell (towards the bottom of FIG. 17A). In the example of FIGS. 17C and 17D, the first leg 381A and the second leg 381B extend in the same direction.

Figure 18:
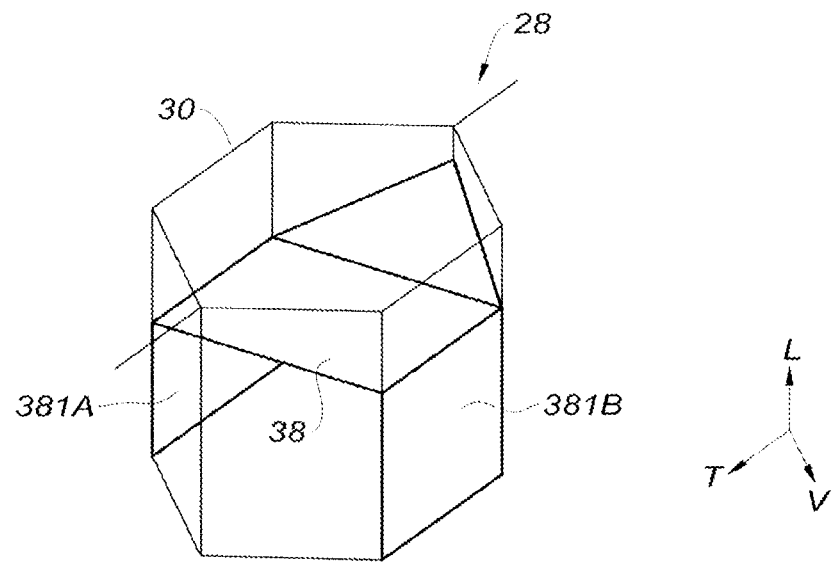
FIG. 18 is a schematic view of an acoustic panel cell according to the present disclosure.

In another example represented in FIG. 18, the first leg 381A and the second leg 381B may extend in the direction of the same end of the associated cell 28, and be linked to one or several non-nodal portion(s) of the first plate 300 and the second plate forming the cells.

The ribbon 380 also comprises a free surface 38 located between the two fastening legs 381A and 381B.

In the example of FIGS. 17A and 17B, the ribbon 380 is folded back on itself so that a portion of the free surface 38 is superimposed on the fastening leg 381A and another portion of the free surface 38 is superimposed on the fastening leg 381B.

FIG. 17B illustrates the deployment of the cell showing the folding of the plate 300 along the fold lines P30, P31, P32 and P33, and the deployment of the free surface 38 between the plies P01 and P03. As indicated above, the unfolding of the ribbon 380 at the level of the fold line P02 is carried out as the plate 300 is folded and the second plate on which the portion 381B is fastened is away from the first plate 300.

It should be understood from the previous description that the forming step, carried out by application of a tensile force on the plates fastened to one another (compare above) makes it possible to simultaneously conform the plates to constitute the cells of the cellular core and the ribbon 380, the free portion 38 of which will constitute an obstacle in this cell.

The obstacle 38 thus constituted is therefore fastened in this example to two non-adjacent, and non-nodal, faces of the associated cell 28. In the example of FIGS. 17A and 17B, it is respectively fastened to a central face of the first plate and to a lateral face of the second plate. Other combinations are possible. For example, the obstacle may be fastened to a lateral face of the first plate and a lateral face of the second plate, the lateral faces being substantially parallel to one another in one form, or else, the obstacle may be fastened to the central face of the first plate and to the central face of the second plate of a given cell.

Combinations are possible. It is thus possible to fasten several ribbons in the same cell and/or in several cells simultaneously manufactured from two plates as described above.

When a cell comprises several ribbons, the fastening portions of these ribbons may be fastened to lateral or central faces and according to directions adapted to constitute baffles capable of attenuating selected frequencies.

According to a manufacturing variant, ribbons 380 of the type described above with reference to FIGS. 17A and 17B may be fastened to the plates after forming the cells, by inserting the ribbons into the cells and then fastening them, for example by gluing, soldering or welding.

The obstacle 38, that is to say the central portion of a ribbon 380 fastened in accordance with FIGS. 17A and 17B, is arranged so as to extend transversely. For example, the obstacle 38 may be arranged so as to extend transversely, generally perpendicularly, with respect to the main axis of the associated cell, that is to say in a manner substantially parallel to the plane T-V. Alternatively, this obstacle 38 (central portion of the ribbon 380) may extend transversely by presenting an inclination with respect to such a plane and/or have a non-planar surface. To this end, the central portion may include one or several fold line(s) P39 to facilitate the forming of the obstacle 38 and to promote the formation of the possible angulation(s).

In addition, when an edge of the central portion of the ribbon 380 extends along one face, for example the lateral face of the first plate 300 located between the fold lines P32 and P33 (FIG. 17A), this edge of the central portion of the ribbon 380 may be fastened, for example by gluing, welding or soldering, to said face. In one form, the edge of the central portion of the ribbon 380 is fastened after forming the assembly.

In another form, such a ribbon 380 may include a third fastening portion which extends from said edge so as to strengthen the retention of the ribbon 380. In this example, this third fastening portion of the ribbon 380 would be fastened to the lateral face of the first plate 300 located between the fold lines P32 and P33 (FIG. 17A).

In another form, at least one portion of the central portion 38 of the ribbon 380 may have a width larger than the width of the fastening portions 381A/381B and/or the width of one face of the cell, for example the distance separating the fold line P31 from the fold line P32. This allows increasing the surface of the obstacle 38 according to a longitudinal projection.

Figure 19:
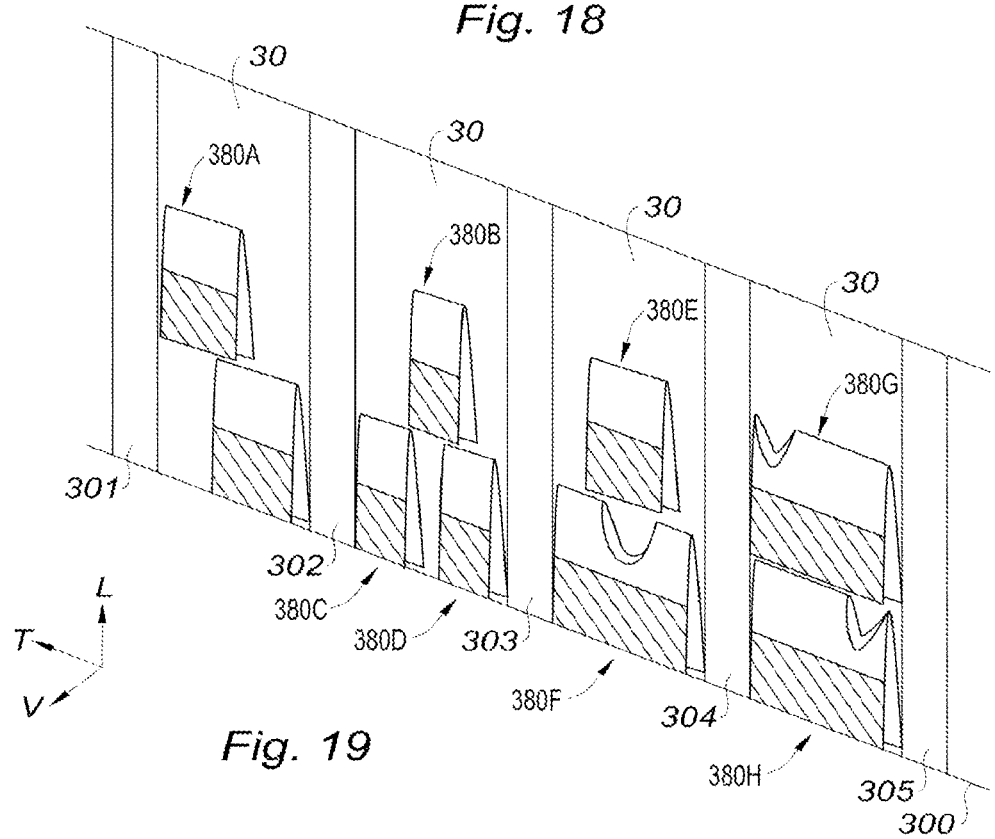
FIG. 19 is a partial schematic view of a plate and of several intracellular ribbons for manufacturing an acoustic panel according to the present disclosure.

FIG. 19 partially shows a first plate 300 comprising several nodal portions 301-305 between which are fastened, in a flat fashion, several ribbons 380A-380H, the first and second legs of which extend in the same direction along the direction L.

At least two ribbons are disposed between each pair of adjacent nodal portions so as to constitute a baffle after fastening the second plate and forming the assembly.

For example, the non-nodal portion 30 located between the nodal portions 302 and 303 comprises three ribbons 380B, 380C and 380D. The ribbon 380B is arranged so as to constitute an obstacle at the center of the cell and the ribbons 380C and 380D are arranged so as to constitute lateral obstacles. Such an arrangement constitutes a baffle making it possible to inhibit the sound waves from drawing a direct path from the front end up to the rear end of the associated cell.

As another example, the non-nodal portion 30 located between the nodal portions 303 and 304 comprises two ribbons 380E and 380F. The ribbon 380E is arranged so as to constitute an obstacle at the center of the cell and the ribbon 380F to constitute a lateral obstacle: to do so, the central portion of this ribbon 380F extends over the entire width of the non-nodal portion 30 and comprises an opening or cutout at its center. Such an arrangement constitutes a baffle making it possible to inhibit the sound waves from drawing a direct path from the front end up to the rear end of the associated cell.

FIG. 19 shows different configurations of ribbons constituting such a baffle, with or without an opening or cutout in the central portion of the ribbon.

The principles illustrated with reference to FIG. 18 or 19 may of course be implemented to constitute cells example with another shape, for example with a quadrilateral section or other.

The variants illustrated with reference to FIGS. 14 and 17 to 19 may be made by gluing the ribbons with the plates in a flat configuration or by inserting the ribbons in the deployed cells and fastening them to the ad hoc areas of the plates.

In these different examples, the fastening legs of the ribbons may be in any shape allowing fastening of the ribbon to the plates and allowing the formation of fold lines capable of constituting the corresponding obstacle(s).

In one variant, it is possible to cut a plate so as to define openings therein then fold and glue the plate thus cut so that this plate forms said peripheral walls of the cells and said at least one obstacle.

The plate thus cut and folded can be glued on itself and/or on one or several other plates.

Figure 20:
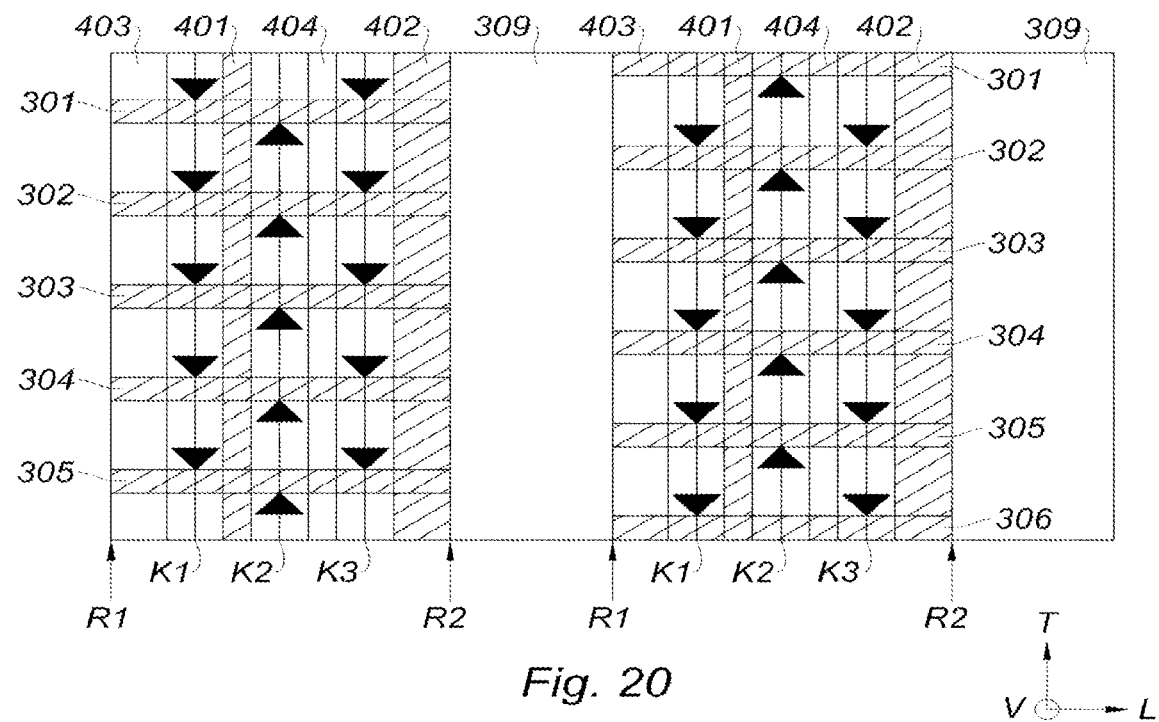
FIG. 20 is a partial schematic view of a plate for manufacturing an acoustic panel according to the present disclosure, in the flat position.
Figure 21:
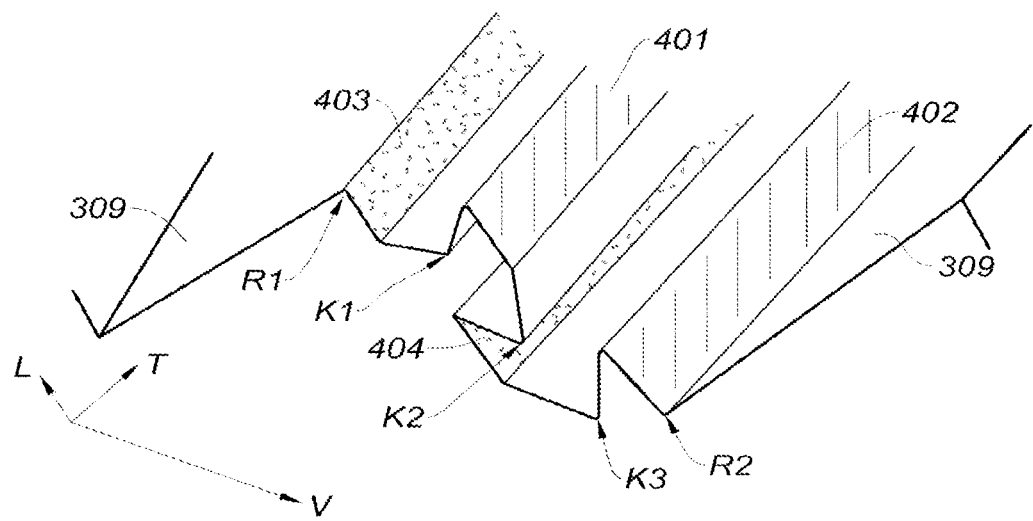
FIG. 21 is a partial schematic perspective view of the plate of FIG. 20 in the partially deployed position according to the present disclosure.
Figure 22:
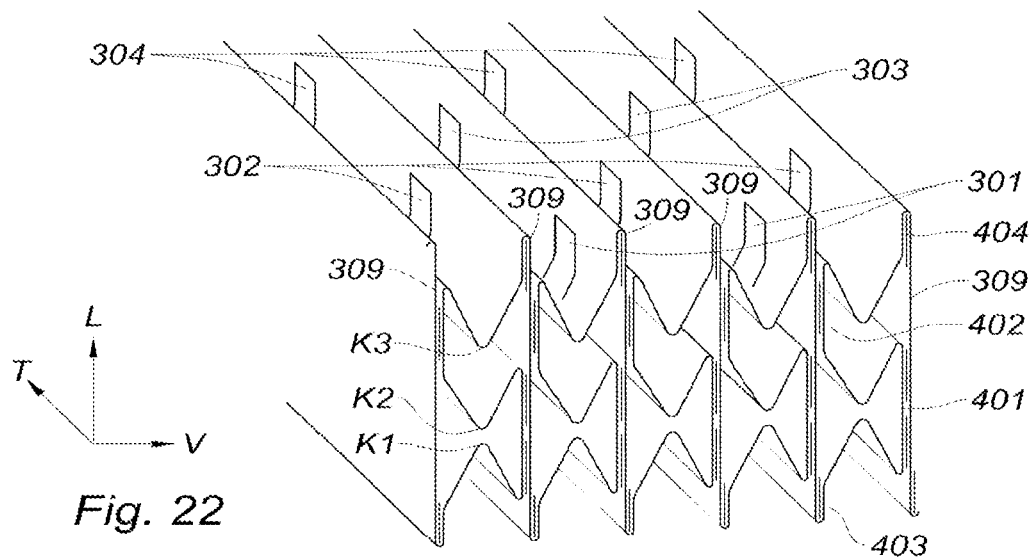
FIG. 22 is a partial schematic perspective view of the plate of FIG. 20 in the deployed position according to the present disclosure.

An example of such a variant is represented at different development steps by FIGS. 20, 21 and 22.

FIG. 20 shows a portion of a plate 300 in a flat state. This plate 300 includes transverse areas 401-404, extending in the direction T, which constitute nodal portions intended to be glued to a portion 309 of the plate 300. In this example, the nodal portions 401 and 402 (hatched vertical bands) located on the right of FIG. 20 are intended to be glued by their front face on the front face of the portion 309 located on the right of FIG. 20. The nodal portions 403 and 404 located on the right of FIG. 20 are intended to be glued by their rear face on the rear face of the portion 309 located on the left of FIG. 20.

FIG. 21 shows a portion of the plate 300 of FIG. 20 folded so as to show the orientation of the vertical nodal and non-nodal portions during the folding carried out for the gluing of the nodal portions 401 and 402 to a portion 309 (located on the right of FIG. 21) and 403 and 404 to another portion 309 (located on the left of FIG. 21).

The plate 300 of FIG. 20 also comprises longitudinal areas 301-306 which constitute nodal portions intended to be glued on themselves and to two adjacent portions 309 of the plate 300.

Each portion delimited by two nodal portions 403 and 401, or 401 and 404, or 404 and 402, is intended to be folded along a fold line K1, or K2 or K3 respectively, and to be glued, along the longitudinal areas 301-306, to another adjacent vertical portion, this other vertical portion also being delimited by two nodal portions 403 and 401, or 401 and 404, or 404 and 402, respectively.

The plate 300 also comprises openings made between two longitudinal nodal portions 301-306 and between two transverse nodal portions 401-404. In the example of FIG. 20, these openings are triangular and extend on either side of the fold lines K1, K2 and K3. In this example, the openings located between two respective longitudinal nodal portions are shifted according to the direction T from one opening to another adjacent opening: thus, for example, by considering three openings located between two respective longitudinal nodal portions (for example between the portions 304 and 305 on the left in FIG. 20), a first opening is located in the proximity of one of these longitudinal nodal portions (for example portion 305), a second opening adjacent to the first opening is located in the proximity of the other of these longitudinal nodal portions (portion 304), and a third opening adjacent to the second opening is located in the proximity of the longitudinal nodal portion in the proximity of which is also located the first opening (portion 305). This arrangement and this opening shape are not limiting, other forms being by example illustrated in FIGS. 24 and 25.

After gluing the different nodal portions of the plate 300 with a corresponding portion 309 (compare above), the plate 300 forms a cellular core comprising cells which extend in the direction L (horizontally in FIG. 20). For example, after folding and gluing, a cell extends between the marker R1 and the marker R2 on the left of FIG. 20, delimiting two adjacent areas 309.

FIG. 20 shows two series of vertical portions each being comprised between a marker R1 and a marker R2. A portion of the plate 300 located between a marker R1 and a marker R2 is intended to constitute a cell of the cellular core (compare below). In this example, from one cell to another, that is to say from a series of transverse portions comprising plies K1, K2 . . . to another adjacent series of transverse portions, the longitudinal portions are shifted transversely (FIG. 20). This transverse shift allows, by pulling on the ends of the portions 309 in the direction V after folding the non-nodal portions between R1 and R2 and gluing from the nodal portions 401-404 and 301-306 to the portions of adjacent plates 309, deploying the cells between the markers R1 and R2, thereby forming cells between two nodal portions 301-306, and deploying the vertical non-nodal portions (located between the nodal portions 403 and 401, or 401 and 404, or 404 and 402).

The length between two successive transverse nodal portions (403 and 401 or 401 and 404 or 404 and 402) should be sufficient so that, after folding according to K1, K2 K3, after gluing the nodal portions 401, 402, 403, 404 with the adjacent portions 309 and after gluing the nodal portions 301-306 on themselves and on the adjacent portions 309, then deployment of the alveolar cells by pulling in the direction V on at least two portions 309, the plies K1 are deployed and the length of the plate between two transverse nodal portions is at least larger than the cell width after deployment.

In an exemplary form, the distance between two nodal areas 301 and 302 being three, the distance between two adjacent transverse nodal areas 403-401 will be at least two. Thus by pulling as much as possible in the direction V on portions 309 to deploy the hexagonal cells as much as possible, these can take on a rectangular shape of dimension two in the direction V and one in the direction T (rectangular cell) and the plie K1 disappears at the middle of the cell.

In another form, the widths (along the direction L) of the transverse nodal portions 401 to 404 will be adopted so that, when the portions between two areas of plates 309 are folded (according to K1, K2, K3), there is at most three thicknesses of plates 300 between two portions 309.

It comes out that the staggered organization of the triangular openings makes it possible to form baffles which increase the length of the path traveled by sound waves that would pass through the cells thus formed.

The openings may have any other shape and be organized differently, provided that the plate 300 thus cut, folded and glued constitutes obstacles and baffles making it possible to increase the length of the wave path.

In one form, the plate 300 is folded, glued and formed to successively make the portions 309 and the transverse portions (401-404, and portions located between the portions 403 and 401, 401 and 404, and 404 and 402). FIG. 22 shows the plate 300 of FIG. 20 thus folded, glued and formed: the nodal portions 301-306 are represented by dashes to indicate their spatial location.

Figure 23:
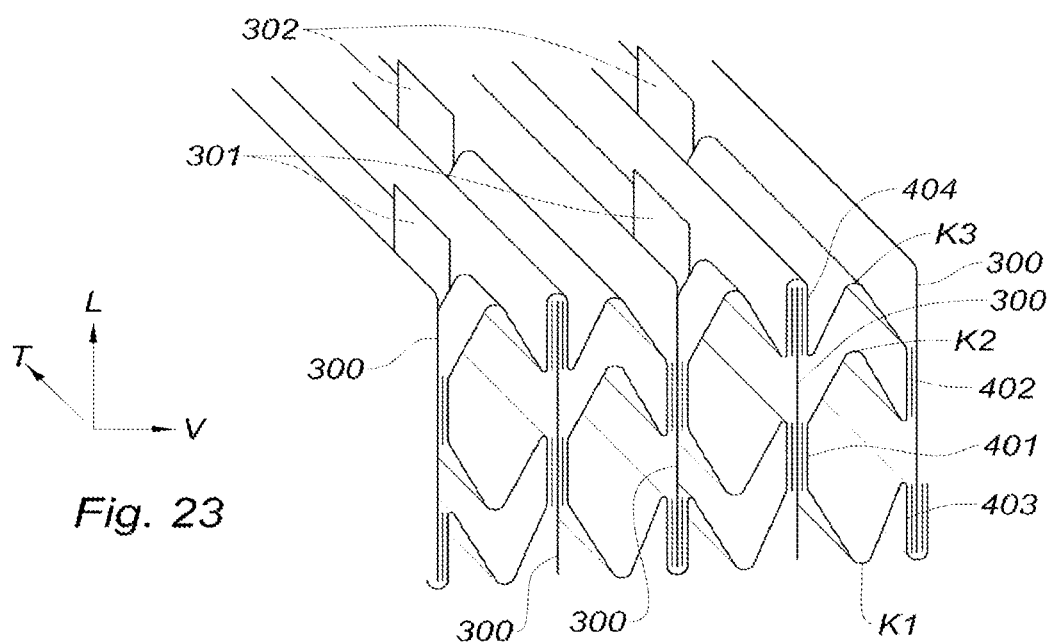
FIG. 23 is a partial schematic perspective view of plates for manufacturing an acoustic panel according to the present disclosure, in the deployed position.

In another form illustrated in FIG. 23, several plates 300 placed parallel in the direction V and which extend in the plane V-T are used. The dimension of the plates 300 in the direction L defines a thickness of the cellular core. The formation of the inner partitions and of the cells is achieved by at least one additional plate which is cut, folded and glued as illustrated in FIG. 23. For example, starting from the lower right corner of this figure, portion 403 of this additional plate is glued to a first plate 300 located to the right of the figure, an adjacent portion is folded along a fold line K1, an adjacent portion 401 is glued to a second plate 300 (the second starting from the right of the figure), an adjacent portion is folded along a fold line K2, an adjacent portion 402 is glued to the first plate 300, an adjacent portion is folded along a fold line K3, an adjacent portion 404 is glued to the second plate 300 and conforms around an edge of the second plate 300 to be arranged therein between the second plate 300 and a third adjacent plate in the same way as between the first and second plate 300, and so on. Each cell between two plates 300 being limited by longitudinal nodal portions 301-306 in the height direction L of the cells and arranged according to successive positions in the direction T.

Figure 24:
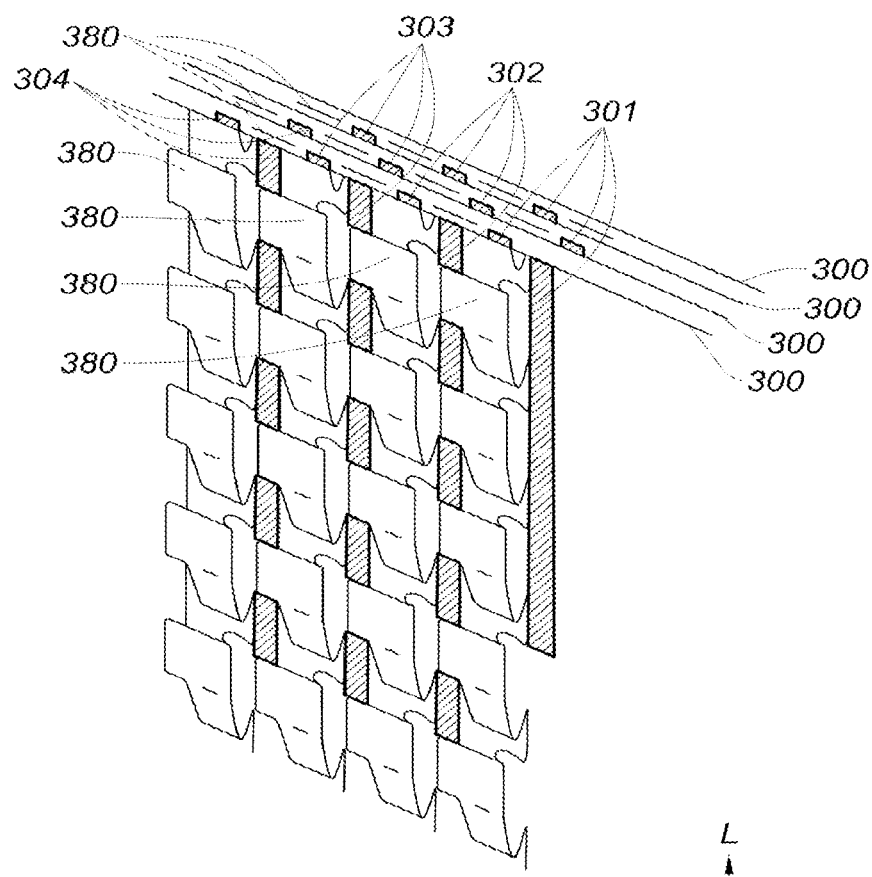
FIG. 24 is a partial schematic perspective view of plates and ribbons for manufacturing an acoustic panel according to the present disclosure.

In a variant illustrated in FIG. 24, the additional plates are in the form of continuous ribbons folded and fastened between two adjacent nodal areas 301-305.

Figure 25:
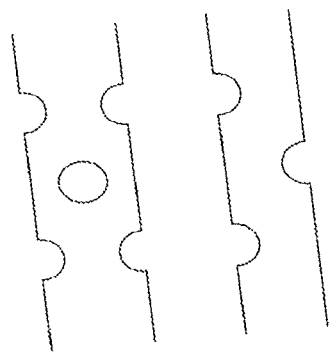
FIG. 25 is a partial schematic view of ribbons for manufacturing an acoustic panel as illustrated in FIG. 24 according to the present disclosure.

FIG. 25 shows two examples of continuous ribbons provided with cutouts suitable for constituting such additional plates.

Of course, the present disclosure is not limited to the examples that have just been described and numerous modifications may be made to these examples without departing from the scope of the present disclosure. For example:

In the form according to the type illustrated in FIGS. 17A to 17D, the ribbon 380 may comprise an additional leg making it possible to strengthen the structural strength of the area 38; this additional leg may be fastened on the central face of the first plate 300, opposite the leg 381A.

In the form according to the type illustrated in FIGS. 17A to 17D, the area 38 may include free edges, that is to say the edges not delimited by the fold lines P01, P02 or P03, which are not straight, for example with a curved, concave or convex shape.

In the form according to the type illustrated in FIGS. 20 to 24, the openings for the passage of the acoustic waves in the cells may be rounded or rectangular or of any other shape.

In the form according to the type illustrated in FIGS. 20 to 24, it is possible to provide in the plate 300 openings or orifices in regions located on the longitudinal nodal portions 301-306, so as to provide a direct connection between two plate portions 309, or where appropriate between two plates.

In one form, implementing a flat manufacturing method, it is possible to provide for ribbons or temporary additional elements having a thickness identical to the ribbons or portions of plates constituting an obstacle 38, in order to promote the parallelism of the plates or plate portions 300 during gluing.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An acoustic panel with resonators for a nacelle of an aircraft propulsion unit, the acoustic panel comprising a plurality of adjoining acoustic cells which form a cellular core, each acoustic cell being delimited by a peripheral wall, and each acoustic cell extending along a longitudinal main axis corresponding to an axis of propagation of sound waves, from a front end up to a rear end of the acoustic cell,
   wherein at least one acoustic cell among the plurality of acoustic cells includes a first obstacle and a second obstacle extending transversely with respect to the longitudinal main axis of the at least one acoustic cell, from the peripheral wall of the at least one acoustic cell, the obstacles having a free end edge which delimits a passage with a portion of an opposite wall to increase a length of a path traveled by the sound waves through the at least one acoustic cell,
   wherein the first obstacle and the second obstacle are shifted along the longitudinal main axis, wherein a passage defined by a free end edge of the first obstacle and a passage defined by a free end edge of the second obstacle is radially shifted so as to form a baffle to increase the length of the path traveled by the sound waves through the at least one acoustic cell, and
   wherein at least one of the first and second obstacles comprises a central portion which extends transversely with respect to the longitudinal main axis of the at least one acoustic cell and two lateral portions, each lateral portion extending in an oblique direction with respect to the longitudinal main axis of the at least one acoustic cell, each oblique direction being between 30° and 60° with respect to the longitudinal main axis.

2. The acoustic panel according to claim 1, wherein a portion of the free end edge of the first obstacle and a portion of the free end edge of the second obstacle are superimposed along the longitudinal main axis of the acoustic cell to inhibit the sound waves from drawing a direct path from the front end up to the rear end of the at least one acoustic cell.

3. The acoustic panel according to claim 1, wherein the at least one acoustic cell includes at least one acoustically permeable septum which extends across the at least one acoustic cell.

4. The acoustic panel according to claim 3, wherein the at least one acoustically permeable septum extends from the free end edge of one of the first and second obstacles, up to the peripheral wall of the at least one acoustic cell.

5. The acoustic panel according to claim 3, wherein the at least one acoustically permeable septum extends from the free end edge of the first obstacle up to the free end edge of the second obstacle.

6. The acoustic panel according to claim 1, wherein the peripheral wall of the at least one acoustic cell comprises six faces forming a hexagonal cell, at least one of the first and second obstacles being fastened to at least two adjacent faces of the at least one acoustic cell.

7. The acoustic panel according to claim 1, wherein the peripheral wall of the at least one acoustic cell comprises six faces forming a hexagonal cell, at least one of the first and second obstacles being fastened to at least two non-adjacent faces of the at least one acoustic cell.

8. A nacelle for an aircraft propulsion unit comprising at least one acoustic panel according to claim 1.

9. A method for manufacturing an acoustic panel according to claim 1, the method comprising:
fastening at least one ribbon to a first plate and a second plate to the first plate by respective nodal portions; and
forming non-nodal portions of the first plate and the second plate, the non-nodal portions being shaped such that each non-nodal portion of the first plate forms, with a respective non-nodal portion of the second plate, the peripheral wall of each acoustic cell delimiting a corresponding acoustic cell of the cellular core, such that a portion of the at least one ribbon forms one of the first or second obstacle in the at least one acoustic cell.

10. The method according to claim 9, wherein, during the fastening step, the at least one ribbon extends throughout the nodal portions of the first plate and the second plate.

11. The method according to claim 9, wherein a strip is fastened to one end of the at least one ribbon during the fastening step, and during the forming step, the non-nodal portion of the at least one ribbon forming the at least one of the first and second obstacles is shaped by pulling the strip.

12. The method according to claim 9, wherein the peripheral wall of the at least one acoustic cell comprises six faces forming a hexagonal cell, the at least one of the first and second obstacles being fastened to three adjacent faces of the at least one acoustic cell, the three adjacent faces being portions of the first plate or the second plate.

13. A method for manufacturing an acoustic panel according to claim 1, the acoustic panel further comprising a first plate and a second plate fastened together by nodal portions, wherein non-nodal portions of the first plate and the second plate form walls delimiting cells of the cellular core, the method comprising fastening the first obstacle to a respective non-nodal portion of the first and second plates.

14. The method according to claim 13, wherein a first fastening leg of the first obstacle is fastened to a non-nodal portion of the first plate, the first fastening leg extending in a direction of a first end of the at least one acoustic cell, and wherein a second fastening leg of the first obstacle is fastened to a non-nodal portion of the second plate, the second fastening leg extending in a direction of a second end of the at least one acoustic cell.

15. The method according to claim 13, wherein a first fastening leg of the first obstacle is fastened to a non-nodal portion of the first plate, the first fastening leg extending in a direction of one end of the at least one acoustic cell, and wherein a second fastening leg of the first obstacle is fastened to a non-nodal portion of the second plate, the second fastening leg extending in a direction of the same end of the at least one acoustic cell.

16. An acoustic panel with resonators for a nacelle of an aircraft propulsion unit, the acoustic panel comprising a plurality of adjoining acoustic cells which form a cellular core, each acoustic cell being enclosed by a peripheral wall, and each acoustic cell extending along a longitudinal main axis corresponding to an axis of propagation of sound waves, from a front end up to a rear end of the acoustic cell,
wherein at least one acoustic cell among the plurality of acoustic cells includes a first obstacle extending from a first side of the peripheral wall and a second obstacle extending from an opposing second side of the peripheral wall, the first and second obstacles extending transversely with respect to the longitudinal main axis of the at least one acoustic cell, the first and second obstacles each having a respective free end edge which delimits a passage with a portion of the peripheral wall opposing the respective free end edge to increase a length of a path traveled by the sound waves through the at least one acoustic cell,
wherein the first obstacle and the second obstacle are spaced from each other along the longitudinal main axis, wherein the passage defined by the free end edge of the first obstacle and the passage defined by the free end edge of the second obstacle are radially shifted away from each other so as to form a baffle to increase the length of the path traveled by the sound waves through the at least one acoustic cell,
wherein at least one of the first and second obstacles comprises a central portion which extends transversely with respect to the longitudinal main axis of the at least one acoustic cell and two lateral portions, each lateral portion extending in an oblique direction with respect to the longitudinal main axis of the at least one acoustic cell, each oblique direction being between 30° and 60° with respect to the longitudinal main axis.

* * * * *